US008672138B2

(12) United States Patent
Raizen et al.

(10) Patent No.: US 8,672,138 B2
(45) Date of Patent: Mar. 18, 2014

(54) ISOTOPE SEPARATION BY MAGNETIC ACTIVATION AND SEPARATION

(71) Applicant: Board of Regents, The University of Texas System, Austin, TX (US)

(72) Inventors: Mark G. Raizen, Austin, TX (US); Bruce G. Klappauf, Austin, TX (US)

(73) Assignee: Board of Regents The University of Texas System, Austin, TX (US)

( * ) Notice: Subject to any disclaimer, the term of this patent is extended or adjusted under 35 U.S.C. 154(b) by 0 days.

(21) Appl. No.: 13/691,723

(22) Filed: Nov. 30, 2012

(65) Prior Publication Data

US 2013/0174731 A1   Jul. 11, 2013

Related U.S. Application Data

(63) Continuation-in-part of application No. 12/941,823, filed on Nov. 8, 2010, now abandoned.

(60) Provisional application No. 61/565,355, filed on Nov. 30, 2011, provisional application No. 61/259,182, filed on Nov. 8, 2009, provisional application No. 61/331,563, filed on May 5, 2010.

(51) Int. Cl.
*B07C 5/02* (2006.01)
(52) U.S. Cl.
USPC .......................................... 209/3.1; 204/157.2
(58) Field of Classification Search
USPC .......................................... 209/3.1; 204/157.2
See application file for complete search history.

(56) References Cited

U.S. PATENT DOCUMENTS

| 848,600 A | 3/1907 | von Pirani |
| 3,953,731 A | 4/1976 | Forsen |
| 4,081,677 A | 3/1978 | Dawson |
| 4,149,077 A | 4/1979 | Yamashita et al. |
| 5,705,902 A | 1/1998 | Merritt et al. |
| 7,323,651 B2 | 1/2008 | Jeong et al. |
| 2011/0278203 A1 | 11/2011 | Raizen et al. |

FOREIGN PATENT DOCUMENTS

FR   2790974 A1   9/2000   ............ B01D 59/34

OTHER PUBLICATIONS

J. W. Beams and F. B. Haynes, "The separation of isotopes by centrifuging," *Physical Review*, 50:491-492 (1936).
W. H. Furry, R. C. Jones, and L. Onsager, "On the theory of isotope separation by thermal diffusion," *Physical Review*, 55:1083-1095 (1939).
W. W. Watson, "Concentration of heavy carbon by thermal diffusion," *Physical Review*, 56:703 (1939).
L. O. Love, "Electromagnetic separation of isotopes at oak ridge," *Science*, 182:343-352 (1973).
N. V. Karlov, et al., "Laser isotope separation of rare earth elements," *Applied Optics*, 17:856-862 (1978).

(Continued)

*Primary Examiner* — David H Bollinger
(74) *Attorney, Agent, or Firm* — Cyrus F. Bharucha; Chowdhury & Georgakis, P.C.

(57) ABSTRACT

A method for separation of isotopes includes vaporizing a sample having two or more isotopes of the same element. A stream of atoms is generated from the vaporized sample. One or more light waves are applied to the stream. The one or more light waves are tuned to prepare one or more specific isotopes in the flowing stream into a set of one or more magnetic states. A magnetic field is applied to the stream, deflecting atoms in the stream based on their magnetic states. Isotopes are collected based on their deflections (or lack of deflection).

21 Claims, 12 Drawing Sheets

(56) References Cited

OTHER PUBLICATIONS

V. S. Letokhov, "Laser isotope separation," *Nature*, 277:605-610 (1979).
E. A. Symons, "Lithium Isotope Separation: A Review of Possible Techniques," *Separation Science and Technology*, 20:633-651 (1985).
J. A. Paisner, "Atomic Vapor Laser Isotope Separation," *Applied Physics B*, 46:253-260 (1988).
B. P. Anderson and M. A. Kasevich, "Enhanced loading of a magneto-optic trap from an atomic beam," *Physical Review A*, 50:R3581-R3584 (1994).
J. C. Robinson, "Atom optics: a new testing ground for quantum chaos," University of Texas at Austin (dissertation), 137 pages (1995).
M. Fleischhauer, "Optical pumping in dense atomic media: Limitations due to reabsorption of spontaneously emitted photons," *Europhysics Letters*, 45:659-665 (1999).
S. Bali et al., "Quantum-diffractive background gas collisions in atom-trap heating and loss," *Physical Review A*, 60:R29-R32 (1999).
B. Ghaffari, et al., "Laser-free slow atom source," *Physical Review A*, 60:3878-3881 (1999).
Z. Q. Zhu and D. Howe, "Halbach permanent magnet machines and applications: a review," *IEE Proceedings, Electric Power Applications*, 148:299-308 (2001).
J. L. Lyman, "Enrichment separative capacity for SILEX (LA-UR-05-3786), " Los Alamos National Laboratory (www.fas.org/sgp/othergov/doe/lanl/docs4/silex.pdf), cover + 7 pages (2005).
J. P. Beardmore et al., "A hexapole magnetic guide for neutral atomic beams," *Review of Scientific Instruments*, 80:073105, pp. 1-5 (2009).
Zhu Xiwen, Huang Guilong, Mei Ganghua, Yang Delin, "Laser isotope enrichment of lithium by magnetic deflection of a polarized atomic beam," *Journal of Physics B: Atomic, Molecular and Optical Physics* 25:3307-3314 (1992).
W. A. van Wijngaarden and J. Li, "Laser isotope separation of barium using an inhomogeneous magnetic field," *Physical Review A*, 49:1158-1164 (1994).
"Isotopes for the Nation's Future," report of the NSAC Isotopes Subcommittee, pp. 1-151, Aug. 27, 2009.
M. Jerkins, I. Chavez, U. Even, and M. G. Raizen, "Efficient isotope separation by single-photon atomic sorting," *Physical Review A*, 82:033414-1-033414-5 (2010).
Mark G. Raizen and Bruce Klappauf, "Magnetically activated and guided isotope separation," *New Journal of Physics*, 14,023059:1-12 (2012).
"New method to separate much-needed medical isotopes," *Institute of Physics*, news article retrieved from http://www.iop.org/news/12/feb/page_54077.html , 2 pages, Feb. 29, 2012.
"Calutron," *Wikipedia*, 6 pages, Sep. 24, 2012.
"Atomic vapor laser isotope separation," *Wikipedia*, 3 pages, Nov. 26, 2012.

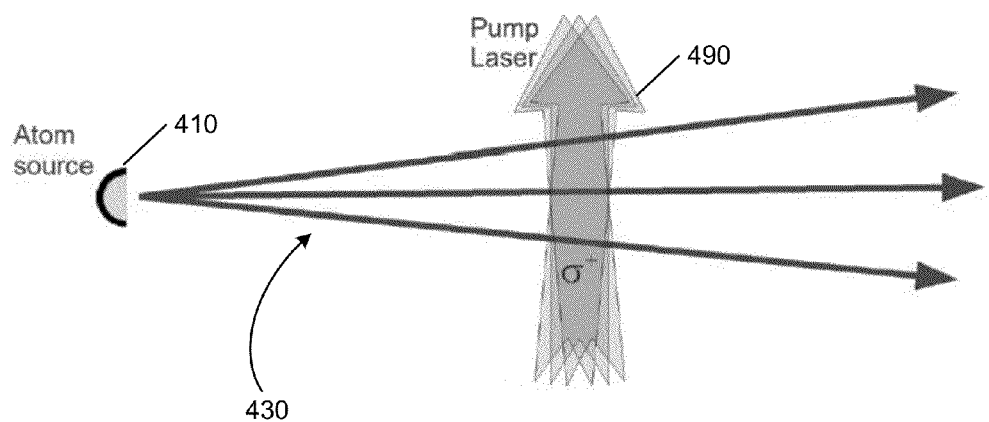
FIG. 4A
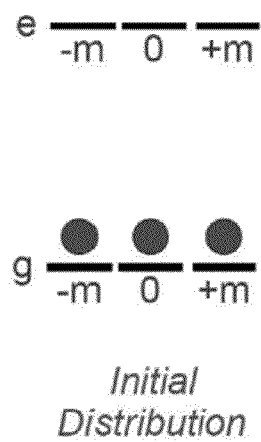 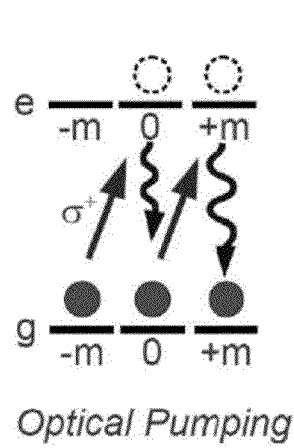 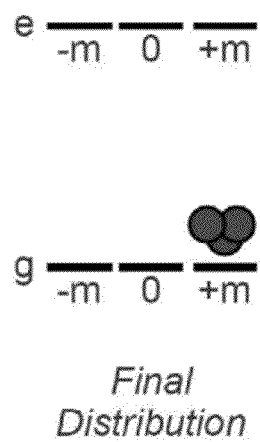
FIG. 4B          FIG. 4C          FIG. 4D

ISOTOPE SEPARATION BY MAGNETIC ACTIVATION AND SEPARATION

PRIORITY INFORMATION

This application claims the benefit of priority of copending U.S. Provisional Patent Application No. 61/565,355, filed on Nov. 30, 2011, titled "Isotope Separation by Magnetic Activation and Separation," and naming Mark Raizen and Bruce Klappauf as inventors.

This application is a continuation-in-part application of copending U.S. patent application Ser. No. 12/941,823, filed on Nov. 8, 2010, titled "Separation of Particles from a Flowing Stream," and naming Mark G. Raizen, Melissa Jerkins, Isaac Chavez, and Uzi Even as inventors, which claims the benefit of priority of U.S. Provisional Patent Application No. 61/259,182, filed on Nov. 8, 2009, titled "Single-Photon Atomic Sorting," and naming Mark G. Raizen, Melissa Jerkins, and Isaac Chavez as inventors, and which claims the benefit of priority of U.S. Provisional Patent Application No. 61/331,563, filed on May 5, 2010, titled "Single-Photon Atomic Sorting: Isotope Separation with Maxwell's Demon," and naming Mark G. Raizen, Uzi Even, Melissa Jerkins, and Isaac Chavez as inventors.

The aforementioned applications are hereby incorporated by reference herein.

FIELD OF THE INVENTION

The present disclosure relates in general to separation of isotopes by magnetic activation and separation. More specifically, this invention is directed to magnetic activation of at least one specific isotope and separation of the at least one magnetically activated isotope using electromagnetic fields. In various implementations, the magnetic activation includes no substantial ionization of the activated isotope.

BACKGROUND

Various isotopes are in high demand for carrying out basic research and also for a variety of industries such as those involved in medicine and energy. In order to be useful, the isotopes are often required in sufficiently high concentration, which may be higher than the naturally occurring abundance of the isotopes. In such situations, the isotopes need to be enriched in concentration relative to their naturally occurring state.

Enrichment of desired isotopes of a common element is extremely difficult due to the isotopes having little if any differences in a variety of their chemical and physical properties. Chemical and physical processes are commonly used for separating atoms of different elements. But such processes are generally not suitable for separating the atoms of an element into different isotopes.

One example of a prior approach to isotope separation involves gaseous diffusion, such as the methods described by W. W. Watson, "Concentration of heavy carbon by thermal diffusion," *Physical Review*, 56:703 (1939) and W. H. Furry et al., "On the theory of isotope separation by thermal diffusion," *Physical Review*, 55:1083-1095 (1939). Another example involves ultra-centrifuge separation such as described by J. W. Beams et al., "The separation of isotopes by centrifuging," *Physical Review*, 50:491-492 (1936). Yet another example of an isotope separation system was the Calutron used during World War II.

Lasers have also been used in isotope separation. In general, such methods involve using a laser to illuminate a vapor sample that includes a mix of isotopes of an element. The laser is tuned to a specific wavelength so that only one desired isotope from the variety of isotopes is excited to an ionized state. In such a process, finely tuned lasers interact with only one isotope. After the desired isotope has been ionized, it can be separated from other the isotopes in the sample by applying an electric field. This method has been referred to as AVLIS (atomic vapor laser isotope separation).

Despite significant interest, the progress of isotope separation technology has advanced slowly. What is needed are more effective or more readily adapted processes, as compared with prior technology, for separating isotopes of elements that are found in nature as mixtures of various isotopes. In various situations, it would be helpful to have techniques that can isolate isotopes with a low natural abundance. In other situations, it would be helpful to be able to purify samples of isotopes that have a moderate or high natural abundance.

BRIEF DESCRIPTION OF THE DRAWINGS

The benefits, features, and advantages of the present disclosure will become better understood with regard to the following description, and accompanying drawings where:

FIG. 1, including

FIG. 2, including

FIG. 3, including

FIG. 4, including FIGS. 4A, 4B, 4C, and 4D, shows an example of an approach for magnetically activating atoms without significantly ionizing the atoms.

FIG. 5, including

FIG. 6, including

FIG. 7, including

FIG. 8, including

DETAILED DESCRIPTION

Figure 1A:
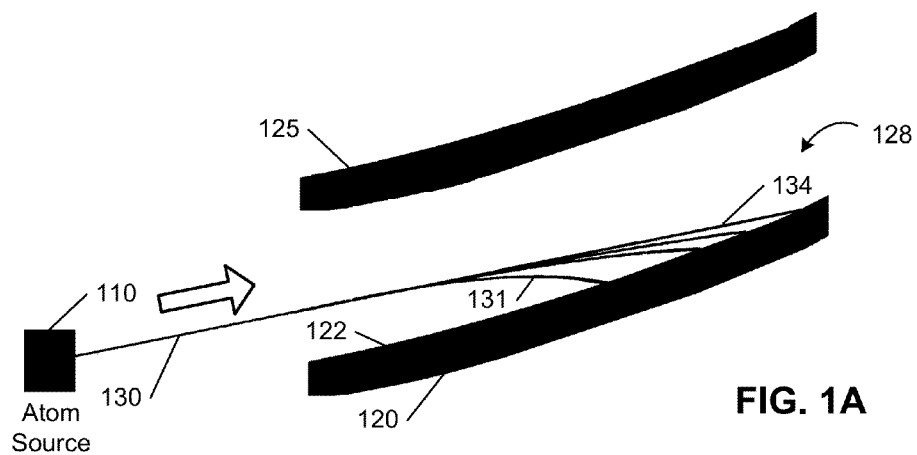
FIGS. 1A and 1B, depicts beams of atoms being deflected by a magnetic field so that the atoms either pass between a set of baffles or collide with the baffles.

Described herein are systems and methods for physically separating different isotopes of a sample of atoms. In various implementations, these techniques can be used to physically separate one isotope of an element from a sample that includes multiple isotopes of that element (and which may include other elements as well). Such separation tools can be used to harvest a desired isotope of an element that may naturally occur as a mixture of various isotopes. In various situations, these techniques can be used to obtain isotopes that are normally found at very low levels in nature.

An example of a method for separating isotopes starts by preparing a source of atoms with several isotopes of a particular element of interest. In various implementations, the atoms are vaporized, at appropriate heat and pressure conditions, to produce a stream of atoms. The stream can be collimated by flowing through a conduit.

A selected isotope among those isotopes is then magnetically activated. One or more light waves are applied to the flowing stream, with the light tuned to convert atoms of the selected isotope into one or more desired magnetic state. In various applications, the desired magnetic state can be a state in which an atom is attracted to a high-magnitude magnetic field. In other applications, the desired magnetic state can be state in which an atom is repelled by a high-magnitude magnetic field (or drawn to a low-magnitude magnetic field). In yet other applications, the desired magnetic state can be state in which an atom is not affected by the gradient of a magnetic field.

The atoms are then spatially separated using a magnetic field with an intensity gradient. The magnetic field deflects the atoms to different degrees based on their magnetic states. Finally, atoms of the desired isotope are atoms are collected from appropriate locations based on the deflections.

In various implementations, the magnetic field is generated by one or more arrays of magnets such as permanent magnets (e.g. rare earth magnets) or electromagnets (e.g. superconducting magnets) or combinations thereof. In some implementations, the magnetic fields are generated by high-temperature superconducting coils. In some configurations, the arrays of magnets are Halbach arrays. In other configurations, magnets are arranged in alternating polarities along a line or curve. In one example, a magnet array includes a series of high-temperature superconducting coils arranged in an alternating geometry so that a surface of the array includes alternating north- and south-polar regions. The magnet arrays are dimensioned so that the deflection of the atoms causes atoms of a desired isotope to be deposited at locations that are separated from atoms of other isotopes.

A brief outline: the following discussion initially addresses various approaches for spatially separating atoms that are in different magnetic states. Various examples of these techniques are illustrated by FIGS. 1, 2, and 3. The discussion then turns to various approaches by which a selected isotope (or selected isotopes) can be "magnetically activated," putting only the selected isotope into particular magnetic states. Some examples are presented in FIG. 4 and the associated discussion. The selected isotopes, once magnetically activated, can then be physically segregated (e.g., using the techniques illustrated by FIGS. 1, 2, and 3).

The discussion then turns to various additional examples that illustrate a variety of further features in FIGS. 5-9.

FIG. 1 depicts beams of atoms being deflected by a magnetic gradient so that the atoms either pass between a set of baffles 120 and 125 or collide with the baffles. The atoms are generated in a source 110 such as an atomic oven. In this illustrative example, the beams are tightly collimated and initially travel in straight lines 130, 180 from atom source 110 towards the baffles. A magnetic field gradient is present in a region 128 between the baffles; the field is most intense near the lower baffle 120, and decreases along the distance from the lower baffle to the upper baffle 125.

In general, a sample of atoms can be a mixture of (a) atoms in a high-field-seeking magnetic state (high-seeking), (b) atoms in a gradient-neutral state, and (c) atoms in a low-field-seeking magnetic state (low-seeking). If the sample is exposed to a magnetic field gradient, the high-seeking atoms will experience a force toward the higher-magnitude regions of the magnetic gradient. Conversely, the low-seeking atoms will be attracted toward the lower-magnitude regions of the magnetic gradient.

FIG. 1A illustrates the paths taken by atoms that are in the high-seeking state. The path taken by any of these atoms depends on its speed. High-velocity atoms are not significantly deflected, and travel a straight line to collide with lower baffle 120, as indicated by path 134. In contrast, low-velocity atoms in the high-seeking state are attracted to the higher-intensity portion of the field, which deflects them toward lower baffle 120, as exemplified by path 131. Intermediate-velocity atoms experience corresponding deflections, as shown by two intermediate paths in FIG. 1A.

Figure 1B:
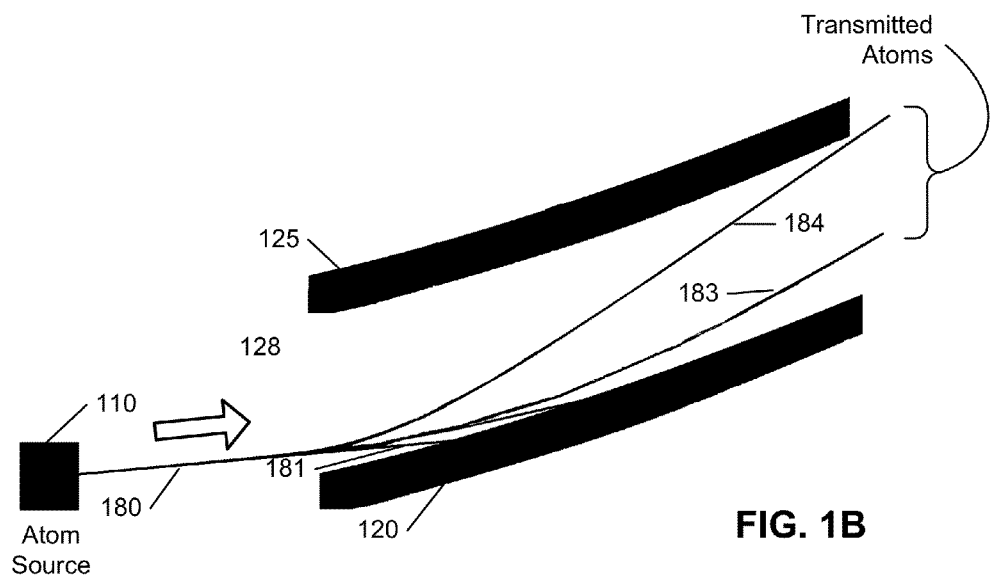

FIG. 1B illustrates the paths taken by atoms that are in the low-seeking state. Again, the path taken by any of these atoms depends on its speed. High-velocity atoms are not significantly deflected, and travel a straight line to collide with lower baffle 120, as indicated by path 181. In contrast, low-velocity atoms in the low-seeking state are forced away from the higher-intensity portion of the field, which deflects them away from lower baffle 120, as exemplified by path 184. Intermediate-velocity atoms experience corresponding deflections, as shown by two intermediate paths (e.g., path 183) in FIG. 1B.

The geometry of the baffles can be selected to assist in isotope separation. The dimensions of the baffles can be based in part on the expected velocity distribution of the atoms, the isotope(s) desired for collection, the profile of the magnetic field gradient, and other factors that determine the paths of the atoms as they enter and traverse the region of the magnetic gradient 128.

This dimensioning is illustrated in FIGS. 1A and 1B. As can be seen from FIG. 1A, baffles 120 and 125 have been dimensioned so that atoms in a high-seeking state are either blocked from entering region 128 by an aperture (not shown), or impact on a straight path with a baffle (path 134), or are deflected toward a baffle (e.g., path 131). As can be seen from FIG. 1B, the baffles have been dimensioned so that atoms in a low-seeking state are either blocked from entering region 128 by an aperture (not shown), or impact on a straight path with a baffle (path 181), or are deflected toward a baffle.

One approach to creating suitable geometries for baffles in isotope separation is to deploy magnet arrays close to the planned path of the atomic sample. This approach facilitates exposing the atoms to high field gradients. A particular technique is to use Halbach arrays for the magnet arrays, or other geometries that provide high field gradients near a surface. Further, the magnet arrays can serve a dual purpose: they can provide the magnetic field gradient and they may additionally serve as baffles onto which various atom trajectories can collide.

For example, baffle 120 may be constructed in whole or in part using a series of magnets arranged in an extended Halbach array. In this example, the Halbach array is deployed so that the high-field side of the Halbach arrays is on the upper surface 122. The high field near this surface attracts the atoms in the high-seeking state as shown in FIG. 1A, and repels the atoms in the low-seeking state as shown in FIG. 1B.

With the arrangement depicted in FIG. 1, the transit through region 128 is survived by only a particular type of atom: atoms in a low-field seeking state. Paths 183 and 184 are transmitted, and contain substantially only atoms in the low-seeking state. Other paths are impacted with surface 122 on the lower baffle.

A variety of geometries are contemplated for separating atoms based on high- and low-seeking states. For example, baffles, apertures, blocks, and various magnet geometries can be used toward a goal of transmitting (or depositing) only atoms in a high-seeking state at a target set of locations. Conversely, these techniques can be used toward a goal of transmitting (or depositing) only atoms in a low-seeking state at a target set of locations.

Figure 2A:
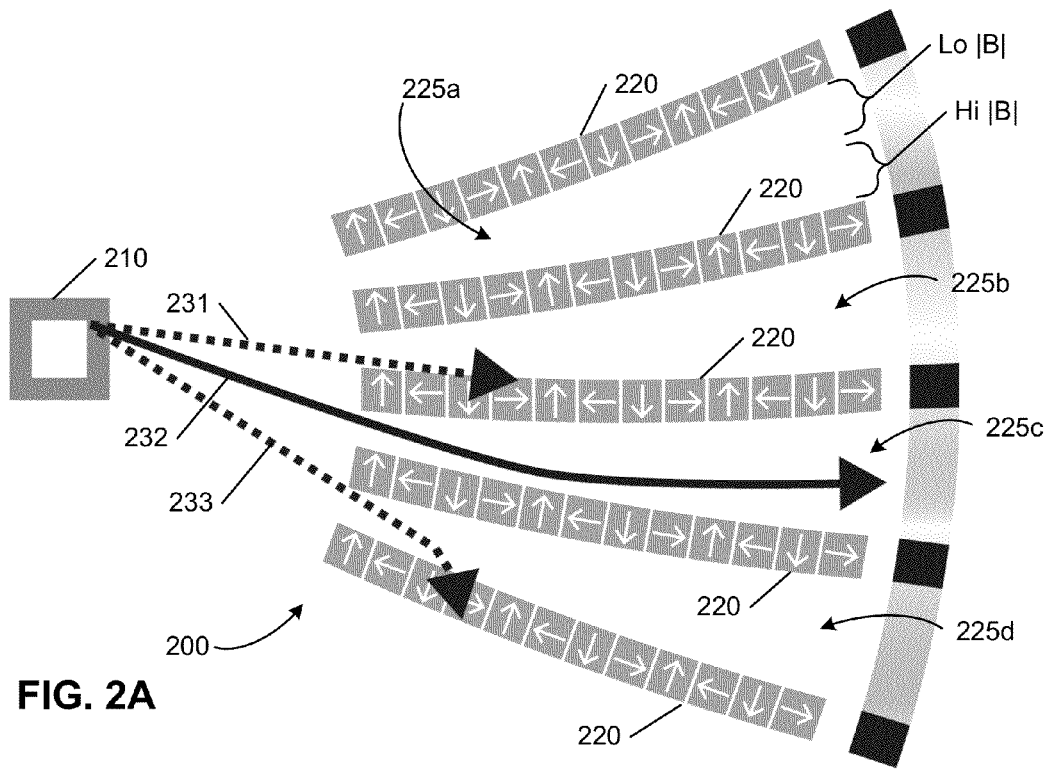
FIGS. 2A and 2B, depicts atoms from an effusive source being separated by a fan of guides.

FIG. 2 depicts atoms from an effusive source being separated by a fan of guides. In FIG. 2A, the atoms are generated in a source 210. In this example, the atom beam is only partially collimated upon exit from the source. Various portions of the beam enter different deflection regions 225a, 225b, 225c, and 225d in a separation assembly 200.

The multiple deflection regions can aid in efficiency, since they allows for a wider spread of the atoms to be gathered by separation assembly 200. The regions 225a-d are separated by Halbach arrays 220 that create magnetic field gradients in the regions. In this example, the high-magnitude portion of the gradients is near the lower portion of each of the regions (by the upper surface of each of the Halbach arrays 220).

The Halbach arrays also serve as baffles. For example, path 231 illustrates the trajectory of an atom that enters region 225b with a high speed: the atom travels in a straight line and collides with a Halbach array. Path 233 illustrates an atom that enters region 225d and which is in a high-seeking state. This path is deflected toward the surface of the Halbach array, where it collides. Finally, path 232 illustrates an atom that enters region 225c and which is in a low-seeking state. This path is deflected away from the surface of the Halbach array, and is transmitted through the separation assembly 200.

In various situations, it may be helpful to arrange Halbach arrays in a curved geometry to provide appropriate baffling and deflection. Such a curvature is depicted in FIG. 2A. The particular form of the curvature may depend on factors such as the type of separation desired, the magnetic properties of the atoms, the mass of the atoms, the strength of the magnets, and the longitudinal and transverse velocity profiles of the atoms.

Figure 2B:
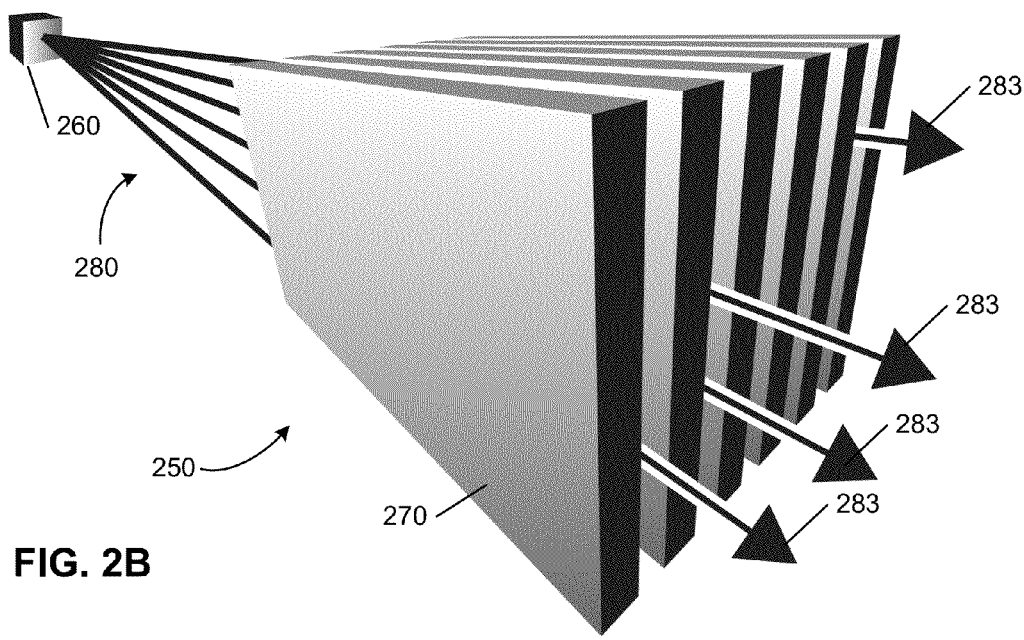

FIG. 2B is an oblique 3D view of a separation assembly 250. Atoms are effused from a source 260 and initially travel in straight paths 280 toward separation assembly 250. The assembly includes a series of Halbach array baffles 270. Only atoms with particular magnetic states 283 are transmitted through the separation assembly 250—the remaining atoms are blocked by colliding with baffles 270. In various situations, the desirable atoms are the transmitted atoms 283 and are collected downstream. In other situations, the desirable atoms are the blocked atoms.

Figure 3A:
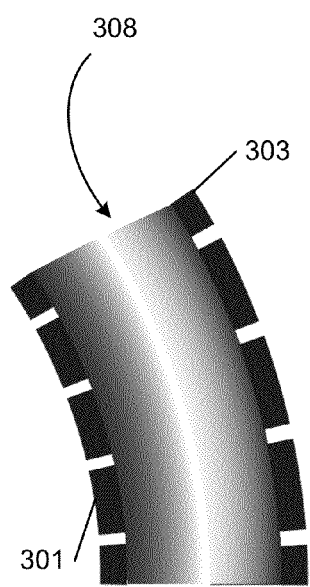
FIGS. 3A, 3B, and 3C, illustrates three examples of geometries for magnet arrays used in isotope separation.

FIG. 3 illustrates three examples of geometric configurations for magnet arrays used in isotope separation. The thick black dashed lines represent the magnets. The first geometric configuration, shown in FIG. 3A, includes two Halbach arrays 301, 303 facing each other about a deflection region 308. Halbach arrays 301, 303 form a trough with magnetic barriers at each internal surface. This forms a guiding field gradient whose cross section in the plane of the paper would look similar to that of a cylindrical-guide cross section (and with the field having some modulation in the direction of the beam). This profile may be useful, for example, in situations that call for multi-stage guiding, since the atoms would exit the first guide with well defined positions and with trajectories in the guiding plane. The use of magnet arrays can greatly simplify magnet design. Since the arrays can be readily designed with an extended 2D surface of high magnetic gradient, they facilitate a larger interaction region than various other magnet arrangements. The array geometry means that the magnetic gradient can more readily interact with a spatially wide stream of atoms. This factor can reduce the demands of initially collimating the atoms, and may substantially increase the throughput of the separation process.

Figure 3B:
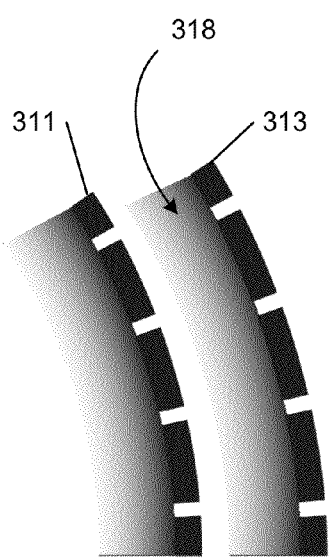

The second configuration, shown in FIG. 3B, employs a series of two or more simple curved barriers. Two Halbach array barriers 311, 313 are depicted in this example about a deflection region 318. The high-gradient surface of the arrays is deployed on the inner curve of each barrier. Line-of-sight transmission can be blocked in this geometry, and there is very little field on the back side of the arrays. As a result, only low-field seeking atoms are deflected away from the magnets and transmitted through the guide.

Line-of sight considerations can be helpful in the design of magnet and baffle geometries for isotope separation. In various geometries described above, there is no direct path for line-of sight transmission through the deflection region. In these geometries, straight-line transmission is not possible from the atom source through the exit of the interaction region. Therefore any atoms going too fast for appreciable deflection (and any nonmagnetic atoms) are blocked in these geometries.

Figure 3C:
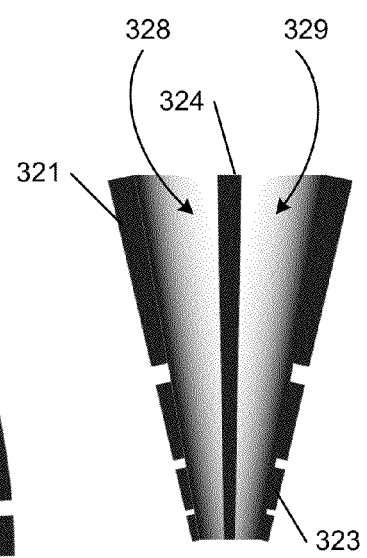

In contrast, the third configuration, shown in FIG. 3C, employs two Halbach arrays 321, 323 that face each other about deflection regions 328, 329. Unlike the first configuration (FIG. 3A), however, the surfaces in the third configuration are not curved. Instead, a blocking baffle can be disposed at the field minimum in the center. The magnet arrays 321, 323 provide additional baffles, at the locations of the field maximum (the surfaces of the magnets).

In traversing the geometry of the third configuration (FIG. 3C), the atoms have no straight line-of-sight from the source to the walls. Therefore any nonmagnetic atoms (or atoms going too fast) can fly straight through regions 328 or 329. In various implementations, a central baffle 324 represents a non-magnetic collection plate at the field minimum. High-seeking atoms can be harvested by collecting them from the surfaces of the magnet arrays 321, 323. Low-seeking atoms can be harvested by collecting them from the surfaces of central baffle 324.

FIG. 4. shows an example of an approach for magnetically activating one of the isotopes in a sample of atoms. The operations shown in FIG. 4 can be used to modify the deflection behavior of a particular isotope before a beam of atoms is sent into a deflection region, such as the deflection regions shown in FIG. 1, 2, or 3. In general, magnetically activating a sample of atoms of an element involves affecting the magnetic states of the atoms so that the magnetic states of an atom is partially or completely correlated with its isotope number.

One approach to magnetic activation is to use optical pumping, in which the states of the atoms are modified by interaction with a resonant or near-resonant optical field. Optical pumping can be made isotope-specific by selecting a pumping scheme in which laser light interacts with only one of the various isotopes in a sample. This is possible because of the isotope shift between the optical transition spectra of different isotopes. For example, the D1 transition in Li-6 is resonant with a particular frequency (wavelength) of light. However, Li-7 atoms are substantially transparent to light at this frequency (wavelength). Thus, with appropriately selected optical pumping schemes, the atoms of one isotope may be effectively pumped while the atoms of other isotopes are substantially unaffected by the pumping laser.

In general, the intensities and wavelengths used for optical pumping do not significantly ionize the atoms. In various situations, optical pumping causes no substantial ionization.

When selecting transitions to be used for optical pumping, appropriate consideration must be given to avoid effective overlaps between the spectra of the different isotopes. The selected transition frequency must be offset from the frequencies of unwanted transitions at least by (a) the laser linewidth and (b) the spread due to Doppler shifts from the atoms' velocity distribution.

An example of optical pumping is illustrated in FIG. 4. Optical pumping is the process by which light acts on an atom to change the atom's magnetic state—usually designated by the magnetic quantum number mj—which determines how it will be affected by magnetic field gradients. In one embodiment, the desired isotope for separation can be optically pumped into a low-seeking state (depending on the mj state), while the other isotopes are optionally optically pumped into a high-seeking state. Atoms exiting the source may be a mixture of all the possible magnetic states, including both high-seeking and low-seeking (except for the special case of isotopes for which mj=0 is the only allowed state).

A source 410 supplies a beam of atoms 430 in FIG. 4A. Light 490 from a pumping laser is applied to magnetically activate or deactivate atoms of a selected isotope (or isotopes). The pumping interaction occurs while the atoms 430 traverse the light 490. As shown in FIG. 4B, the selected isotope will, in general, have one or more ground states (g) and one or more excited states (e) for the optical transition that is addressed by pump laser light 490. The ground sate will, in general, have multiple magnetic sublevels. Each of the magnetic sublevels have positive, negative, or zero values of mj. In various situation, being in the positive mj sublevels (+m) or negative mj sublevels (−m) can cause atoms to be in low-field seeking states or in high-field seeking states (e.g., depending on the value of $g_J$.) Atoms in the mj=0 states are not directly influenced by magnetic field gradients.

FIG. 4B includes three circles that represent the initial distribution of the atoms of the selected isotope: they are evenly distributed among the various mj sublevels of the ground state. Pump laser light 490 is tuned in frequency so that atoms from the ground state absorb photons from the laser field and are driven to the excited state, as shown in FIG. 4C. In addition, light 490 is polarized (e.g., with some σ+ or σ− component) so that the excitation is accompanied by a shift in magnetic sublevel. This polarization may be achieved using at least partially circularly-polarized light, possibly with an appropriate background magnetic field or field gradient. In the example of FIG. 4C, the pump light is σ+ polarized, so that the atoms are driven to change their mj value by +1 when promoted to the excited state. In various pumping schemes, atoms preserve their mj value during spontaneous emission back to the ground state. As shown in FIG. 4D, after a few such transitions, the pumped atoms (e.g., the atoms of the selected isotope) exit the pumping beam with a modified distribution: a statistically large fraction (or substantially all) of the pumped atoms are in the highest-value mj state.

If the atoms 430 are sent from the optical pumping interaction into a magnetic-gradient deflection region, the pumping will influence the distribution of isotopes among the various trajectories. For example, atoms of the optically pumped isotope may be directed into a baffle in a deflection region, so that only a different isotope is transmitted through the deflection region.

In general, the pumping interaction uses less than 10, 20, or 30 photons/atom. As an example, a 1 W laser in the visible range of the spectrum can be used to separate on the order of $10^{18}$ atoms/s, or ~50 moles per year. Additionally, a scheme can be used to focus on a single minority isotope (e.g., an isotope present at less than 50% or less than 40% or less than 20% or less than 10% or less than 50% or less than 1% or less than 0.5%, based on total number of isotopes present. Typically, it can be that the optical pumping step is the step that primarily limits both the rate of production and the degree of enrichment. In addition to stray magnetic fields and imperfect polarization of the laser, reabsorption of the scattered photons by other atoms in the beam can reduce the efficiency of optical pumping, which can be countered for example by limiting the atom flux.

The angular divergence of a single stream intersected by each guide can be small enough such that Doppler shifts may be relatively small compared with isotopic shifts. The divergence angle can be on the order of ±1 degree, where typical transverse Doppler shifts can be 17 to 100 MHz per degree off perpendicular for atoms of velocity 1000 m/s and transitions in the UV to near-IR range. As these can be relatively large compared to many atomic transition linewidths, multiple passes of the laser at different angles can be used. For example, FIG. 4A shows laser light 490 intersecting the beam of atoms 430 at several different angles. The angles can be centered around the entry angle for each guide in an array. Alternatively the laser bandwidth could be broadened to cover the Doppler width (e.g. using a laser modulator).

While the concept of dividing the isotopes into different magnetic moment states may be applicable all elements, particular schemes for doing this can be unique to each element. The frequencies used, the number of isotopes that will be pumped, the use of meta-stable excited states or ground states, the polarizations used, and even the power levels needed can be element dependent.

A wide variety of geometries are contemplated for generating the magnetic gradients. Various approaches to magnetic separation can be drawn in 2-D, as can be seen from the example of FIG. 2A, discussed above. Thus, the guiding or deflecting used in the separation step is not restricted to 3-D cylindrical multipole guides, which also can be used. Therefore, a wide variety of magnet geometries that include planar arrays that act in a plane, but which substantially leave the atoms free to travel into and out of the plane can be contemplated. Such magnetic deflection and reflection geometries can make the apparatus used in the overall separation process simpler and more efficient. Such magnetic geometries include, but are not limited to, planar Halbach arrays. Halbach arrays maximize the field on one side of the array and minimize it on the other, with the range of the field being on the order of the size of the magnets. As mentioned above, the force F applied to an atom by the magnets depends on the atom's magnetic quantum number and the gradient of the magnetic field magnitude ∇B (primarily toward the magnet surface) by $F=-\mu_B g_J mj \nabla B$, where $\mu_B$ is the Bohr magneton, and $g_J$ is the Lande g-factor. This typically leads to accelerations of 10-100 km/s$^2$ for gradients of on the order of 1 T/cm achievable with available rare-earth permanent magnets.

Various approaches can be used to prepare the initial source of atoms discussed above (e.g., atom sources 110, 210, 260, or 410). In one embodiment, a flowing stream of neutral atoms of a particular element is produced. As one example, an open crucible can be filled with a pure element (the feedstock) and introduced into a vacuum chamber, or the crucible can be refilled without having to open the vacuum chamber. The crucible can be made from a material that can be heated to a high temperature and does not react chemically with the atoms. Examples include tungsten, tantalum, graphite, and stainless steel. For very high temperature elements the crucible can be heated by a non-contact method such as by RF induction heating, or an electron beam. These methods can reach appropriate temperatures, typically in the range of 1000-3000 degrees Kelvin. The atomic-phase vapor emitted by the heated crucible can emanate in any variety of directions, for example in a half-plane above the crucible. A hemispherical chamber may be used to divide the flux into many outgoing guides, so as to maximize the useful flux from a single oven, such as the embodiment shown in FIG. 2A.

Vaporization of the desired element in the crucible or oven can be carried out at a temperature at which the vapor pressure of the element is at least 1 Pa, preferably at a atom density of at least $1×10^{12}$ cm$^{-3}$ or at least $1×10^{13}$ cm$^{-3}$ at least $8×10^{13}$ cm$^{-3}$. The total number of atoms/second using a simple open oven can be approximated by N=n v A/4, where v is the average velocity and A is the area of the source. For example, at a pressure of 1 Pa and a surface area of 1 cm$^2$ this can be approximately $4×10^{18}$ atoms/s in the case of lithium, or about 1 kg/year. By increasing the pressure and area, separation of the desired isotope can reach hundreds of kilograms per year per chamber. While there is the possibility of collisions of the atoms with each other, the rate does not become significant until even higher densities, and only a fraction of these collisions will be detrimental. The final efficiency will depend on the optical pumping efficiency discussed in greater detail below, and the fraction that will enter the guides with the appropriate velocity and incident angle to be guided. In principle, the ultimate enrichment achievable depends only on the ability to selectively and efficiently magnetically activate appropriate isotopes without significant ionization.

Figure 5A:
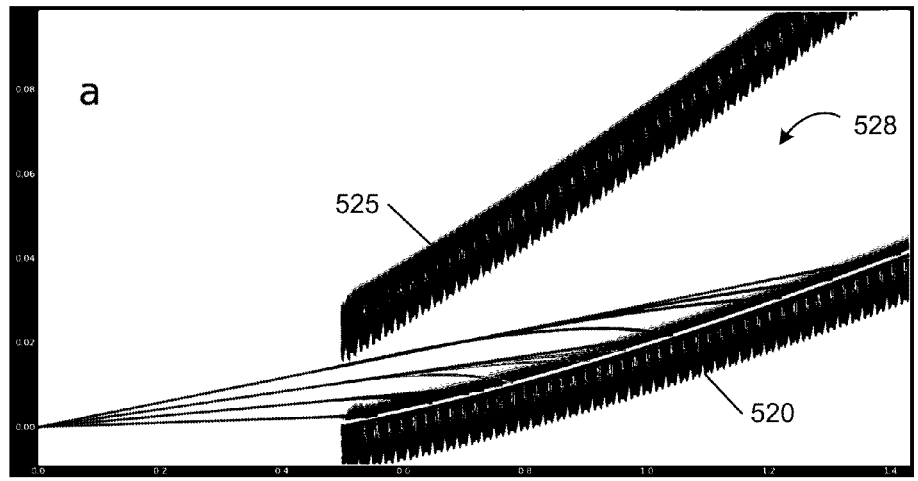
FIGS. 5A and 5B, shows simulations of several trajectories of atoms from an effusive source directed at a magnet array.
Figure 5B:
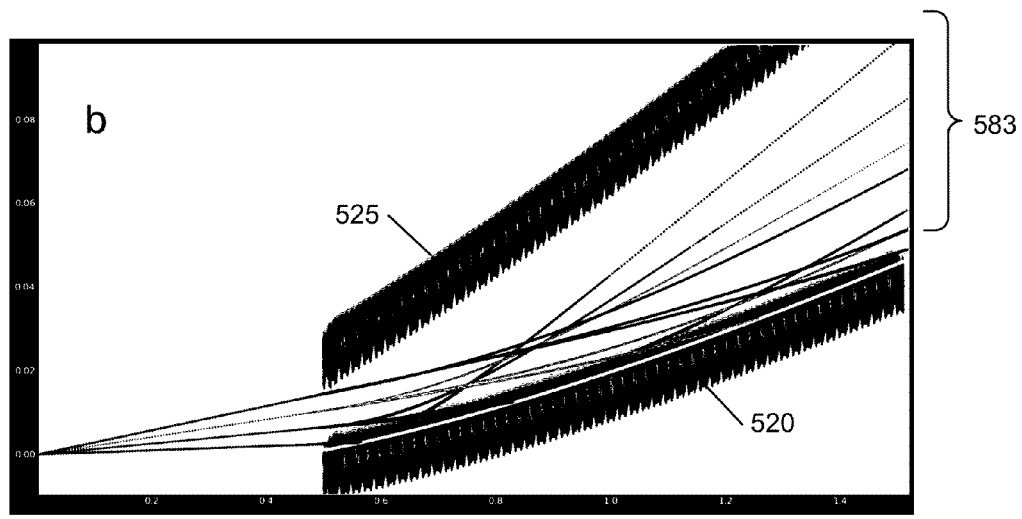

FIG. 5 shows simulations of several trajectories of atoms from an effusive source directed at a magnet array. Trajectories for lithium were simulated, at several different velocities, as they enter a one sided guide consisting of a 1 m long Halbach array 520 and a baffle 525 around a deflection region 528. Halbach array 520 is made up of 1 cm×1 cm square magnets in the plane of the trajectory. An infinite length into the page was assumed for the field calculation. The results are shown for two cases: that of high-seeking atoms (FIG. 5A), and that of low-seeking atoms (FIG. 5B).

Four incoming angles are shown for the atoms, each separated by 0.5 degrees, with 3 velocities shown for each angle. Velocities used were 500 m/s (trajectories 530a and 580a), 1000 m/s, and 1500 m/s. In various situations, other velocities may be suitable, such as a thermal distribution with a peak of approximately 1800-1900 m/s or a temperature profile of 550 degrees C. or 600 degrees C. FIGS. 5A and 5B also show the case for mj=0 (the straight-line trajectory in each plane), which also represents the special case of infinite-speed. This case is a helpful design consideration, and serves to illustrate that this geometry has been dimensioned so that it blocks all non-low-field seekers.

In the context of FIG. 4, all the optically pumped Li-6 atoms would be directed into array 520, following paths such shown in FIG. 5A. In contrast, the Li-7 would be split between the 5A and 5B trajectories, allowing about half of it to be collected at the exit aperture 583. In this configuration the magnets can be covered by removable sheets. Each magnet and guide-entrance pair in this embodiment extends across 50 mrad of arc, allowing 40 of these to fit into a ±1 radian spread from the source. The guide entrance in this example covers 60% of the area, with 10-20% of the low-field seeking atoms transmitted, totaling to around 3% of the source atoms.

Figures 6A, 6B:
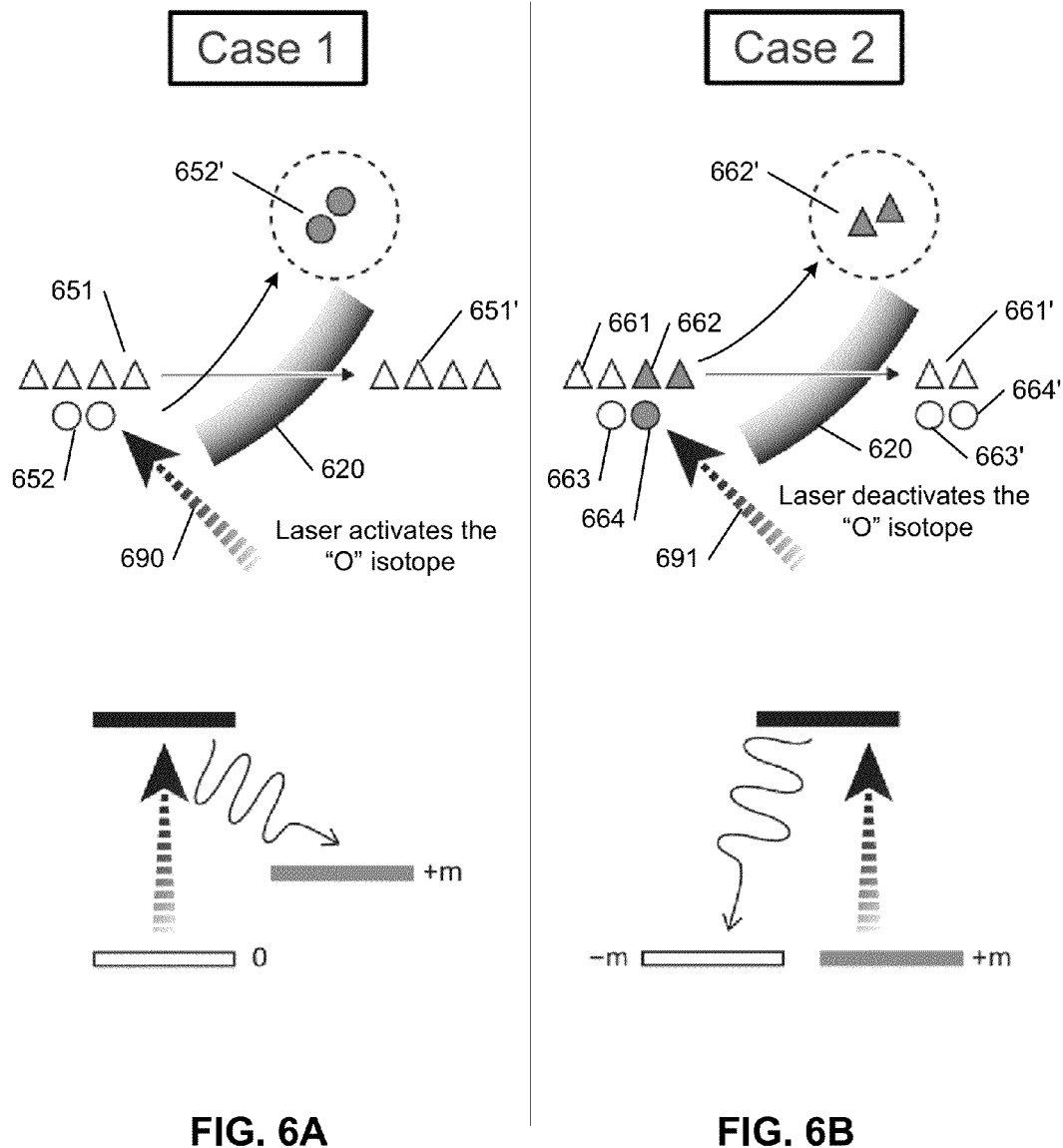
FIGS. 6A, 6B, and 6C, illustrates three examples of techniques for ef-isotope activation and separation.
Figure 6C:
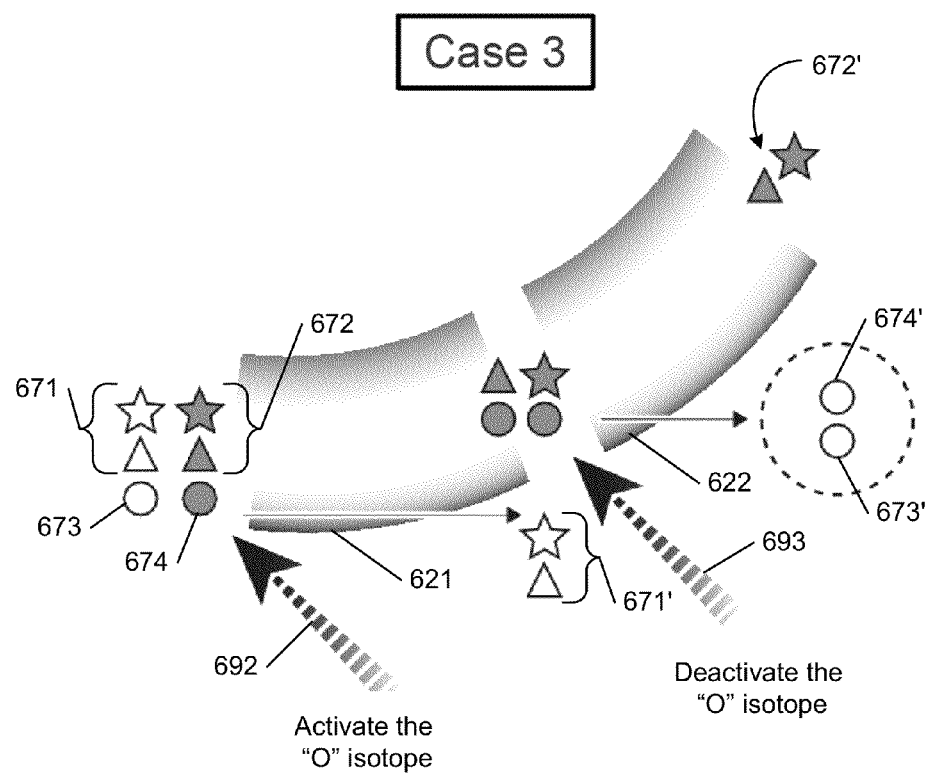
Figure 6C:
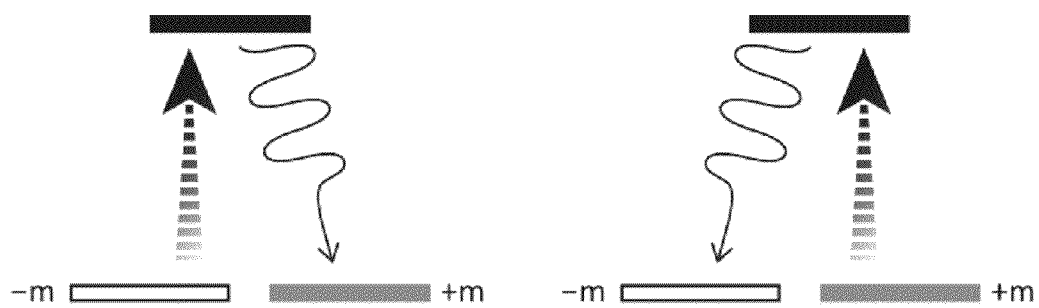
Figures 7A, 7B:
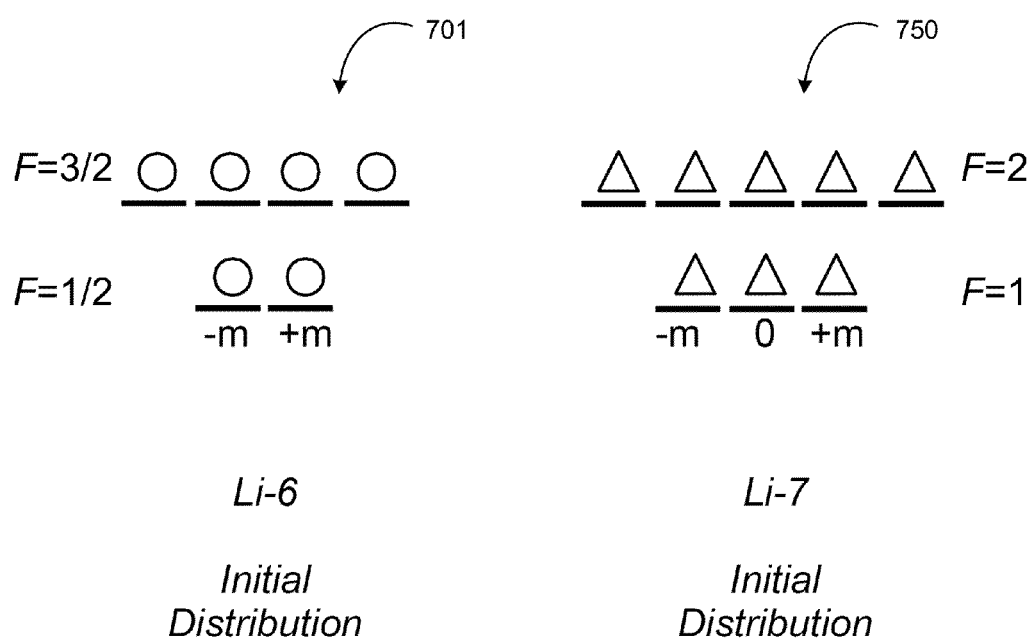
FIGS. 7A and 7B, shows the ground-state structures of Lithium-6 and Lithium-7.

FIG. 6 illustrates three examples of techniques for isotope activation and separation. These three different cases may be suitable for isolating different isotopes or performing separations for different elements.

In Case 1 (FIG. 6A), an initial sample with two different isotopes (symbolized by triangles 651 and circles 652) is directed through a pump beam 690 and into a deflection region with a magnet-array block 620. The pump activates the "circle" isotopes and the deflection region is configured so that only activated atoms are deflected. The result is that the activated "circle" isotopes 652' are passed and the "triangle" isotopes are blocked 651'. Separation can be achieved with a high degree of enrichment (greater than 99%). An example of this case is the separation of various isotopes of Calcium or Ytterbium, which have nonmagnetic ground states. In this case, the desired isotope is preferably optically pumped into a metastable electronic state (magnetically activated), as the other isotopes are not intended to be magnetically guided, and the magnetically activated isotope can be separated using a curved waveguide.

In Case 2 (FIG. 6B), an initial sample with two different isotopes (symbolized by triangles 661, 662 and circles 663, 664) is directed through a pump beam 691 and into a deflection region with a magnet-array block 620. In this example, the initial sample includes atoms from each isotope with mj values that would lead to blocking (atoms 661, 663) and atoms from each isotope with mj values that would lead to deflection (atoms 662, 664). Atoms 664 are removed by optical pumping to a non-deflected state that ends up being blocked (664'). The result is that a portion 662' of the (non-pumped) "triangle" isotopes are passed and the other atoms 661', 663', and 664' are blocked.

If a laser is only used for depletion by optical pumping to an unguided state, then the efficiency of Case 2 is similar to that of Case 1 above. The prototype for this scenario is Li-7. Another interesting case is zirconium, which when depleted of Zr-91, is useful for nuclear fuel rod cladding. This case may require multiple lasers however due to the multiple occupied low lying states.

Case 3 (FIG. 6C) represents another scenario that may be used where a high degree of enrichment is desired, but the natural abundance is low. This is a two-stage process. A first laser 692 activates a selected isotope (depicted by circles), changing its distribution, from part low-seeking 674 and part high-seeking 673, to 100% low-field seeking. That first selected isotope is then passed by a first stage magnet array 621. Other isotopes remain in a mix of part low-seeking 672 and part high-seeking 671; they are partly passed and partly blocked 671'.

In the second stage, a second laser 693 deactivates the selected isotope, changing its distribution, from all low-seeking to all high-seeking 673', 674'. That first selected isotope is then blocked by a second stage magnet array 622. Other previously-passed isotopes remain low-seeking; they are all passed 672' by the second stage.

If the desired isotope is represented by the non-optically selected atoms, these atoms 672' can be collected at the exit of the second stage. If the desired isotope is represented by the optically selected atoms, these atoms 673', 674' can be harvested from the surface of the second-stage block.

In the example of Li, one could apply the same method used for Li-7 (Case 2, above) in order to produce highly enriched Li-6. However, the laser power required can be a factor of 14× higher than for depleted Li-6, since photons are needed to optically pump every Li-7 atom in the stream. In addition, the flux would preferably be kept a factor of 14× lower in order to avoid radiation trapping. Finally, the maximum enrichment may be lower such as around 60% due to incomplete optical pumping.

As an improvement for the case of Li, a variation of Case 3 can be used. The stream of Li atoms can be allowed to enter a magnetic guide with or without optical pumping. This can be carried out in order to filter out atoms that cannot be guided due to their high transverse velocity or negative magnetic state. After a curved section of guiding, the Li-6 atoms are preferably optically pumped to a high-field seeking state that cannot be guided. These atoms can be deposited on the walls (with a liner that can be removed) and harvested. The atoms that are magnetically guided can include a majority of Li-7. According to this embodiment, photons are used to optically pump the desired isotope for separation, so the power requirements are as in the previous case; radiation trapping can be greatly reduced; the degree of enrichment can be decoupled from the optical pumping efficiency. An optical pumping state can be optionally added at the start of the waveguide in order to prepare the desired isotope in an optimally guided state. This can increase the required laser power by a factor of two. This embodiment can be applied to a wide range of isotopes where there are many undesired isotopes that would otherwise have to be individually optically pumped. For example, Mo-100, typically used for production of Tc-99 for medical imaging, and for production of Gd-157 or Gd-155 for nuclear fuel efficiency.

FIG. 7 shows the ground-state structures of the naturally occurring isotopes of lithium. Lithium-6 (701) has a natural abundance of approximately 7.5%. While Lithium-7 (750) is more abundant (92.5%), there is significant commercial interest in purifying Lithium-7. However large volumes of material would need to be processed. Lithium is particularly suited to the techniques described herein. In particular, the melting temperature of lithium (180 deg C.) is well below one predicted working temperature of from 500-2000 deg C., thereby making the continuous recycling of material feasible.

In strong magnetic fields, the optical spectrum of lithium crosses into the Paschen-Back regime, a range of external magnetic field values where the hyperfine states are no longer good quantum states. Instead, the ground states are split into two fine structure manifolds at very low magnetic fields (>30 Gauss). These two-level manifolds are shown for Li-6 in FIG. 7A and for Li-7 in FIG. 7B.

Figure 8A:
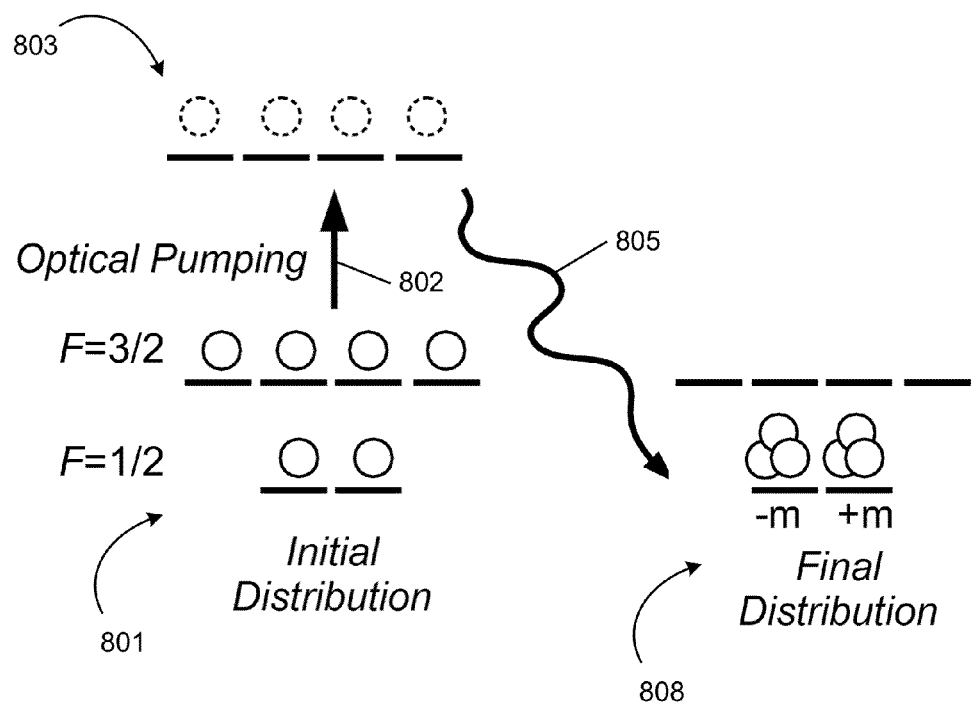
FIGS. 8A, 8B, and 8C, illustrates an approach for purifying Lithium-7 from an initial sample that has Li-6 and Li-7 isotopes.

FIG. 8 illustrates an approach for purifying Lithium-7 from an initial sample that has Li-6 and Li-7 isotopes. FIG. 8A illustrates the naturally occurring distribution of Li-6 in the ground state (801). Li-6 can be optically pumped (802) from this initial distribution, e.g., using the D1 transition, via an excited state (803) and spontaneous decay (805) in to an activated distribution (808) that is useful for separation.

Figure 8B:
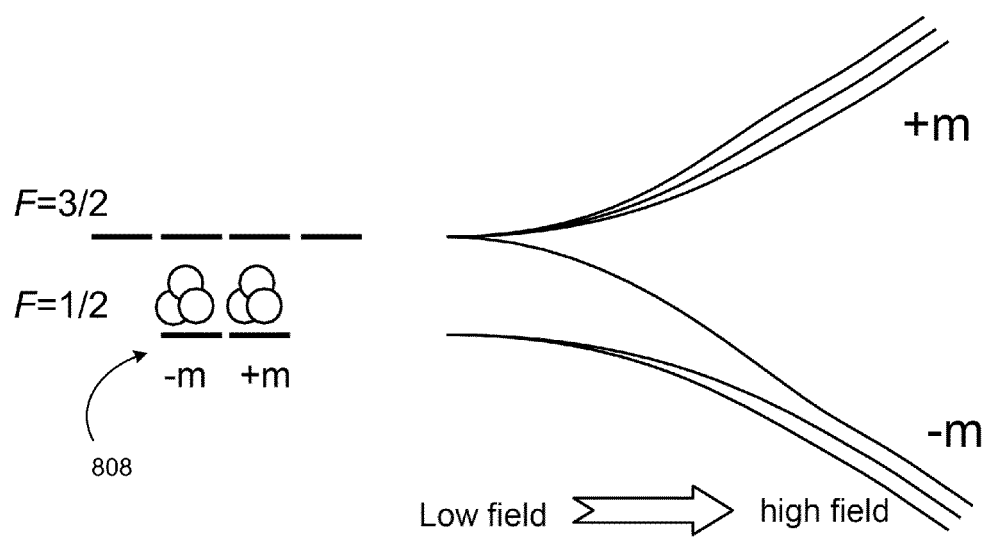

As shown in FIG. 8B, the resulting activated distribution 808 of Li-6 is substantially all in a high-field seeking state (−m) in the Paschen-Back regime, which can be achieved by using appropriately high-strength magnetic fields in the separation/deflection process. Thus, the optical pumping (802) from FIG. 8A provides control over the deflection of Li-6 atoms. In one implementation of a lithium separation process, the Li-6 atoms are directed into a block by an appropriate magnetic gradient.

Figure 8C:
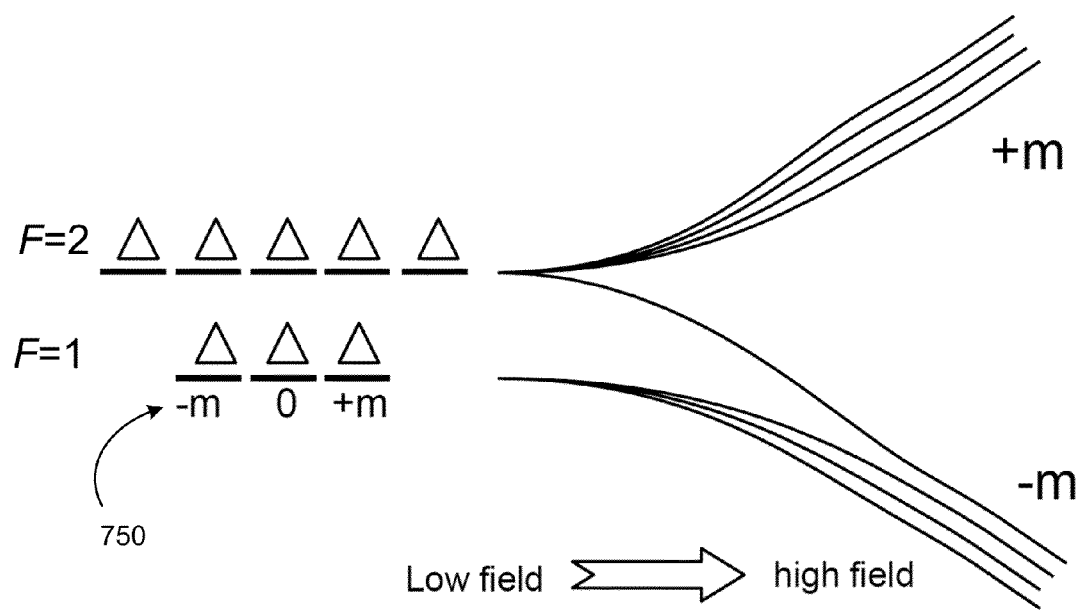

In contrast, Li-7 atoms can be made to pass through the interaction region. The Li-7 atoms in a beam would not be affected by the pumping 802 that modifies the Li-6 atoms in the beam. The Li-7 atoms would remain in their naturally-occurring mixture of hyperfine levels and magnetic sublevels (750). FIG. 8C shows the effect of high magnetic fields on the Paschen-Back level splitting of Li-7. A fraction of the Li-7 atoms would be blocked, along with the activated Li-6 atoms. The remaining Li-7 atoms would be passed by the interaction region, where they can be harvested.

The pumping in FIG. 8A can be performed, for example, with available semiconductor lasers. Any variety of optical pumping schemes can be used, for example a pumping scheme such as disclosed by Xiwen et al., "Laser isotope enrichment of lithium by magnetic deflection of a polarized atomic beam," *Journal of Physics B: Atomic, Molecular and Optical Physics*, 25:3307, 1992. Because the isotope shift in lithium is so large (~10 GHz), Li-6 atoms can be excited via the D1 transition (e.g. $2^2S_{1/2}(F=3/2)$—$2^2P_{1/2}(F=3/2)$) with little if any chance of scattered light being Doppler shifted to the Li-7 transition at thermal velocities. Therefore the optical pumping, and hence the enrichment level, is only limited by the density of the Li-6 fraction.

Figure 9:
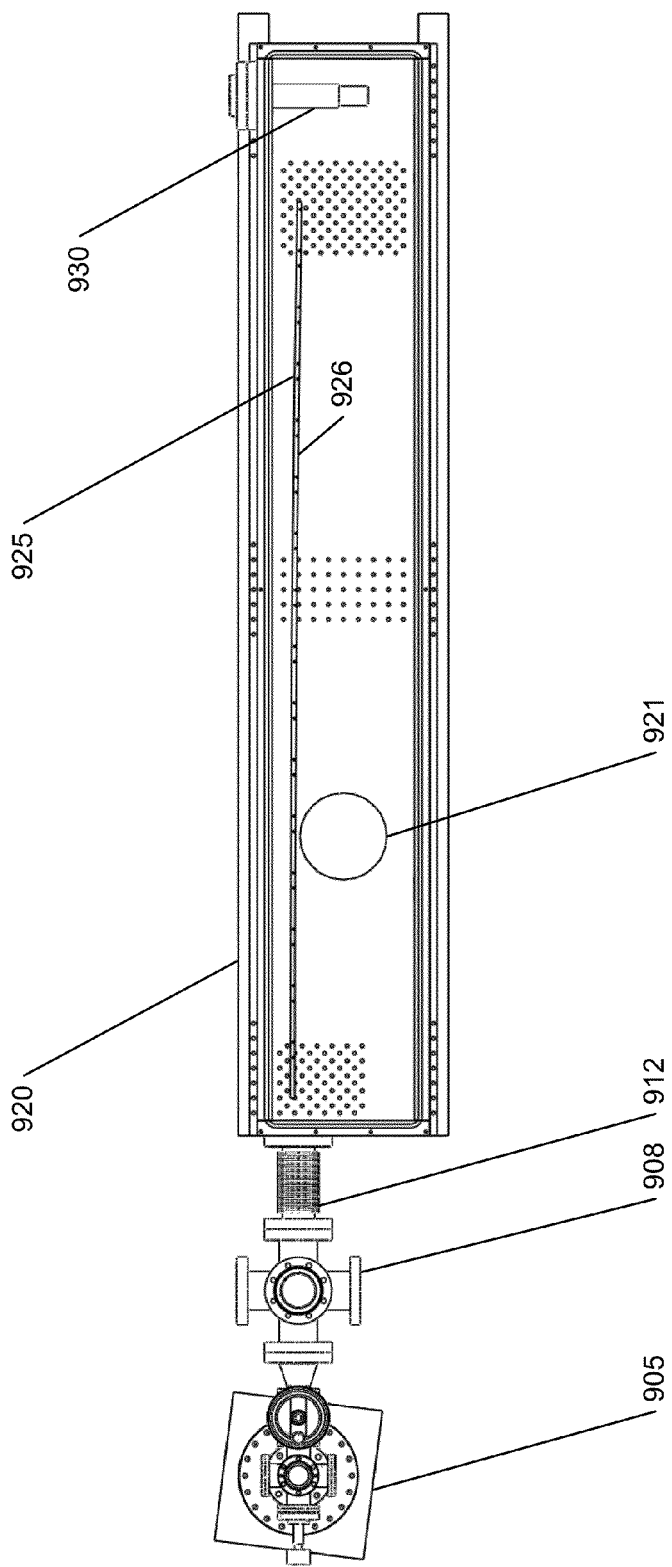
FIG. 9 shows an example of an apparatus for separating isotopes.

FIG. 9 shows an example of an apparatus for separating isotopes. A hot vapor sample of an element is prepared in a preparation chamber 905. The vapor sample includes at least two isotopes of one element. In one example, the vapor is prepared by heating a 0.5 gram sample of lithium purified to an initial abundance of 95% Li-6 and 5% Li-7. The vapor sample is effused through a collimator to generate an atomic beam that is sent into an interaction region 908. In interaction region 908, the atoms are optically pumped using laser light that selectively addresses one of the isotopes (e.g., Li-6 D1 transition (e.g. $2^2S_{1/2}(F=3/2)$—$2^2P_{1/2}(F=3/2)$)). The atomic beam proceeds through a flexible bellows 912 into an interaction chamber 920. Bellows 912 may be helpful, for example, in making initial alignments of the chambers 905 and 920 during proof-of-principle testing. Interaction chamber 920 includes various ports for connecting to vacuum pumps, such as port 921. A magnet array 925 is deployed in interaction chamber 920. The atomic beam enters interaction chamber 920 from bellows 912 and can be additionally collimated by an aperture (not shown) at the entry into interaction chamber 920. The atomic beam proceeds substantially parallel to a surface 926 of magnet array 925. Magnet array is configured to generate a magnetic field with a high gradient near surface 926. Some of the atoms in the atomic beam strike surface 926 whereupon they adhere to surface 926. Other atoms are transmitted past magnet array 925 toward a residual gas analyzer (RGA) 930 where they are detected. In various implementations, RGA 930 can be replaced by a collection plate for harvesting isotopes.

In preliminary trials, an apparatus such as shown in FIG. 9 has been used to separate a beam of Li-6 and Li-7 atoms. The Li-6 atoms were almost completely deflected to surface 926. From the foregoing discussion, it is expected that approximately 50% of the Li-7 atoms were deflected to surface 926. Data from RGA 930 indicate that the amount of Li-6 arriving in the region of the detector was attenuated to approximately 0.5% to 1.0% (as compared to the amount arriving with the optical pumping light turned off in interaction region 908).

Various isotopes can be purified or isolated using magnetic activation and deflection. Further discussion is available in "Magnetically activated and guided isotope separation" by M. G. Raizen and Bruce Klappauf, *New Journal of Physics* 14 (2012), which is hereby incorporated by reference. It is helpful, but not necessary, if when the element of interest collides with a collection surface, such as a surface of a magnet array or a surface of a harvesting plate, its atoms adhere to surfaces for subsequent harvesting. For at least this reason, various implementations of the separation process use an element that has a relatively low vapor pressure at the chamber temperature. Preferably, atoms formed in the chamber from the vaporization step have an electronic magnetic moment in a ground state that can be optically pumped, or that can be excited with a laser to a meta-stable state that has a magnetic moment.

In various implementations of a separation system, Ca-48 and certain isotopes of Mg, Sr, Ba, Zn, Cd, Pb, Yb and In can be magnetically activated and separated. In other implementations of a separation system, Li-7, Zr (e.g., through depletion of Zr-91), U (enrichment of U-235 to reactor grade), Mo-98, Mo-100, Gd-155, Gd-157, Ni-64, Lu-176, and certain isotopes of Er, Dy, Fe, Cr, Ti, Sm can be magnetically activated and separated. In additional implementations, Li-7, Li-6, Zr-90, Mo-98, Mo-100, Gd-155, Gd-157, Ni-64, Lu-176, and certain isotopes of Er, Dy, Fe, Cr, Ti, Sm are magnetically activated and separated.

In one embodiment, the method can be carried out in a vacuum chamber maintained at a background pressure (e.g., approximately 10^−7 torr or 10^−8 torr) at which collisions with background gas will not significantly deflect the target atoms from their desired trajectories through the apparatus. This pressure can be at or below $10^{-4}$ Pa using vacuum pumps. The method can be scaled up in parallel with multiple chambers. Atoms that do not enter the guides can be collected on a surface of the source unit for reuse, or reflowed back to the source depending on the element.

In various implementations, a magnet array is a repeating pattern of Halbach arrays. A magnet array can be deployed in a straight line, partly parallel to a center line of an atomic beam that travels adjacent to the surface of the magnet array. Alternatively, or in conjunction, a magnet array can include a curvature that guides various component of the atomic beam.

Atoms in the beam typically have a distribution of lateral velocities, and thus intersect with the surface of the magnet array at different distances away from the source location. In various implementations, a magnet array serves as a full block for all the atoms in a beam that are not in a low-field seeking state. Such a magnet array can be arranged so that all non-pumped atoms in the beam collide with the magnet array. Near one end of the magnet array, the highest velocity atoms collide with the array. Near an opposite end of the magnet array (distal from the atom source), the lowest velocity atoms collide with the array.

In one example, a magnet array has a curvature that varies along the length of the magnet array, with a curvature based on a source location for the atomic beam. The array's curvature can be chosen so that the angle of incidence of the atoms, from the source location, is substantially uniform along the length of the magnet array.

In various implementations, an isotope separation and collection process can use optical interaction without magnetic interactions. For example, in the context of FIG. 6A, if light beam 690 imparts sufficient transverse linear momentum to the atoms of isotope 652, then that isotope may be adequately deflected without the need for additional deflection from a magnetic gradients. In such a situation, magnet array 620 can be replaced by a non-magnetic baffle that collects the atoms 651' of the other isotope(s).

The principles and modes of operation of this invention have been described above with reference to various exemplary and preferred embodiments. As understood by those of skill in the art, the overall invention, as defined by the claims, encompasses other preferred embodiments not specifically enumerated herein.

What is claimed is:

1. A method comprising:
preparing a first isotope among a sample of atoms, wherein
the first isotope has an initial isotopic abundance among isotopes of an element in the sample; and
causing at least a portion of the sample to move adjacent to a surface such that only a first fraction of the sample impacts with a first section of the surface,
the first fraction has a first isotopic abundance for the first isotope, and
the first isotopic abundance is different from the initial isotopic abundance.

2. The method of claim 1, wherein:
the surface comprises a surface of a baffle; and
the baffle comprises an array of magnets.

3. The method of claim 1, wherein the preparing the first isotope comprises magnetically activating at least a portion of atoms among the first isotope.

4. The method of claim 1, wherein the preparing the first isotope comprises optically pumping at least a portion of atoms among the first isotope, the method comprising:
causing a deflection of at least a portion of the sample, wherein a deflection of an atom depends at least in part on an optical-pumping status of the atom.

5. The method of claim 1, wherein the first isotope is a desired isotope.

6. The method of claim 1, comprising:
gathering a desired isotope from the first section of the surface.

7. The method of claim 1, wherein the first fraction is substantially isotopically pure with regard to the element.

8. The method of claim 1, wherein:
a second fraction of the sample impacts a location distinct from the first section of the surface;
the second fraction has a second isotopic abundance for the first isotope; and
the second isotopic abundance is different from the initial isotopic abundance and from the first isotopic abundance.

9. The method of claim 8, wherein the second fraction bypasses the surface.

10. The method of claim 8, wherein the second fraction is substantially isotopically pure with regard to the element.

11. The method of claim 1, comprising:
causing a second portion of the sample to move adjacent to a second surface such that
only a first fraction of the second portion impacts with a first section of the second surface,
the first fraction of the second portion has a third isotopic abundance for the first isotope, and
the third isotopic abundance is different from the initial isotopic abundance.

12. A system comprising:
a source of atoms having a plurality of isotopes of an element;
a device configured to prepare atoms of a first isotope among the plurality of isotopes; and
a unit having a first surface, wherein
a stream of atoms from the source passes through at least a portion of a magnetic gradient adjacent to the first surface, and
the length of the first surface is sufficiently long that a substantial fraction of at least one isotope is spatially separated, by the magnetic gradient, from the stream of atoms.

13. The system of claim 12, comprising:
a second unit having a second surface, wherein
a second stream of atoms from the source passes through at least a portion of a second magnetic gradient adjacent to the second surface, and
the length of the second surface is sufficiently long that a substantial fraction of at least one isotope is spatially separated, by the second magnetic gradient, from the second stream of atoms.

14. The system of claim 12, comprising:
a baffle disposed such that at least one isotope of the element from the stream of atoms impacts on the baffle and at least one other isotope of the element from the stream of atoms does not impact on the baffle.

15. The system of claim 14, wherein the baffle comprises the first surface.

16. The system of claim 12, wherein the unit comprises one or more of: a Halbach array, a permanent magnet, an electromagnet, a superconducting magnet, or a high-temperature superconducting magnet.

17. The system of claim 12, wherein the first surface has a curvature such that atoms from the stream of atoms impinge on the first surface at different locations but with a common angle of incidence.

18. A method comprising:
- optically pumping atoms of a first isotope in a sample of atoms into a first set of magnetic states, wherein the first isotope has an initial isotopic abundance among an element in the sample;
- after said optically pumping the atoms of the first isotope into the first set of magnetic states,
    - removing atoms of the element other than atoms in the first set of magnetic states from the sample; and
- after said removing,
    - optically pumping atoms of the first isotope in the sample out of the first set of magnetic states, and
    - harvesting atoms of the element other than atoms in the first set of magnetic states from the sample.

19. The method of claim 18, wherein said removing comprises:
- deflecting atoms of the element in the first set of magnetic states.

20. The method of claim 18, wherein the harvested atoms are Li-6 atoms.

21. A substance that is actually obtained by acts comprising:
- preparing a first isotope among a sample of atoms, wherein the first isotope has an initial isotopic abundance among isotopes of an element in the sample; and
- causing at least a portion of the sample to move adjacent to a surface such that only a first fraction of the sample impacts with a first section of the surface, the first fraction has a first isotopic abundance for the first isotope, and the first isotopic abundance is different from the initial isotopic abundance.

* * * * *